(12) United States Patent
Novak et al.

(10) Patent No.: US 10,275,934 B1
(45) Date of Patent: Apr. 30, 2019

(54) AUGMENTED VIDEO RENDERING

(71) Applicant: Disney Enterprises, Inc., Burbank, CA (US)

(72) Inventors: Jan Novak, Zurich (CH); Christopher Schroers, Zürich (CH); Fabrice Pierre Armand Rousselle, Ostermundigen (CH); Matthias Fauconneau, Zurich (CH); Alexander Sorkine Hornung, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/849,524

(22) Filed: Dec. 20, 2017

(51) Int. Cl.
*G06T 15/06* (2011.01)
*G06T 15/40* (2011.01)
*G06T 15/20* (2011.01)
*G06T 19/00* (2011.01)
*G06T 15/50* (2011.01)

(52) U.S. Cl.
CPC ............ *G06T 15/20* (2013.01); *G06T 15/506* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 9,165,401 B1* | 10/2015 | Kim | ........................ | G06T 15/50 |
| 2003/0031380 A1* | 2/2003 | Song | ...................... | G06T 15/00 |
| | | | | 382/284 |
| 2006/0232598 A1* | 10/2006 | Barenbrug | .............. | G06T 15/04 |
| | | | | 345/582 |
| 2007/0103465 A1* | 5/2007 | Barenbrug | ............ | G06T 15/005 |
| | | | | 345/426 |
| 2007/0216680 A1* | 9/2007 | Wang | ...................... | G06T 15/04 |
| | | | | 345/424 |
| 2009/0027391 A1* | 1/2009 | Burley | .................... | G06T 15/04 |
| | | | | 345/426 |

(Continued)

OTHER PUBLICATIONS

Burley, Lacewell. "Ptex: Per-Face Texture Mapping for Production Rendering," *Eurographics*, 2008. pp. 1-10.

(Continued)

*Primary Examiner* — Martin Mushambo
(74) *Attorney, Agent, or Firm* — Farjami & Farjami LLP (57) ABSTRACT

A video rendering system includes a field-of-view detector, a display, and a computing platform including a hardware processor and a memory storing a multi-viewpoint video rendering software code. The hardware processor executes the multi-viewpoint video rendering software code to parameterize visible surfaces in a scene to define multiple texels for each visible surface, precompute one or more illumination value(s) for each texel of each visible surface, and for each texel of each visible surface, store the illumination value(s) in a cache assigned to the texel. In addition, the multi-viewpoint video rendering software code receives a perspective data from the field-of-view detector identifying one of multiple permissible perspectives for viewing the scene, and renders the scene on the display in real-time with respect to receiving the perspective data, based on the identified perspective and using one or more of the illumination value(s) precomputed for each texel of each visible surface.

12 Claims, 5 Drawing Sheets

(56) References Cited

U.S. PATENT DOCUMENTS

| | | | | |
|---|---|---|---|---|
| 2011/0221752 A1* | 9/2011 | Houlton | ............... | G06T 15/50 |
| | | | | 345/426 |
| 2012/0038549 A1* | 2/2012 | Mandella | ............... | G06F 3/011 |
| | | | | 345/156 |
| 2012/0038645 A1* | 2/2012 | Norrby | ............... | G06T 15/60 |
| | | | | 345/426 |
| 2013/0135298 A1* | 5/2013 | Isogai | ............... | G06T 15/04 |
| | | | | 345/419 |
| 2014/0292757 A1* | 10/2014 | Tokuyoshi | ............... | G06T 15/50 |
| | | | | 345/426 |
| 2014/0306963 A1* | 10/2014 | Sun | ............... | H04N 13/0402 |
| | | | | 345/427 |
| 2014/0375659 A1* | 12/2014 | McGuire | ............... | G09G 5/363 |
| | | | | 345/520 |
| 2015/0116316 A1* | 4/2015 | Fitzgerald | ............... | G02B 27/01 |
| | | | | 345/419 |
| 2015/0138069 A1* | 5/2015 | Fuchs | ............... | G02B 27/017 |
| | | | | 345/156 |
| 2015/0348316 A1* | 12/2015 | Porcino | ............... | G06T 7/40 |
| | | | | 345/426 |
| 2015/0350628 A1* | 12/2015 | Sanders | ............... | G06T 15/08 |
| | | | | 345/419 |
| 2017/0018111 A1* | 1/2017 | Collet Romea | ............... | G06T 15/00 |
| 2017/0103562 A1* | 4/2017 | Mitchell | ............... | G06T 13/20 |
| 2017/0263043 A1* | 9/2017 | Peterson | ............... | G06T 15/005 |
| 2017/0309049 A1* | 10/2017 | Law | ............... | H04N 13/275 |

OTHER PUBLICATIONS

Koniaris, et al. "Real-time Rendering with Compressed Animated Light Fields," *Graphics Interface*, 2017. pp. 1-9.

Munkberg, et al. "Texture Space Caching and Reconstruction for Ray Tracing," *SIGGRAPH Asia*, 2016. pp. 1-13.

Kivánek, et al. "Radiance Caching for Efficient Global Illumination Computation," *IEEE TVCG*, 2005. pp. 1-21.

\* cited by examiner

AUGMENTED VIDEO RENDERING

BACKGROUND

Virtual reality experiences, such as single and multi-player virtual reality games, merge video images with real physical actions in a way that can provide a powerfully interactive experience to a user. For example, a virtual reality system may utilize a head-mounted display (HMD) in combination with a tracking controller that tracks user actions, gestures, and motion in a virtual reality environment. Moreover, such a system may permit the user to move freely within the virtual reality environment and attempt to render video imagery that is responsive to the unconstrained movement of the user.

However, a major limitation associated with conventional virtual reality systems is that video quality tends to be inversely proportional to the freedom with which the user is permitted to move within the virtual reality environment. As such, conventional video rendering solutions are typically capable of providing cinematic or high quality video only for static user viewing perspectives.

SUMMARY

There are provided augmented video rendering systems and methods for use by such systems, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses an augmented video rendering solution that overcomes the drawbacks and deficiencies in the conventional art. The present solution includes parameterizing visible surfaces in a scene, and precomputing one or more illumination values for each texel of each visible surface to provision the scene with rendering data prior to rendering the scene. In addition, the present solution includes identifying one of multiple permissible perspectives for viewing the scene adopted by a user, and rendering the scene based on the identified permissible perspective and one or more of the precomputed illumination values. As a result, the present augmented video rendering solution advantageously enables a user to adopt multiple viewing perspectives for viewing the scene, while concurrently rendering cinematic quality video.

Figure 1:
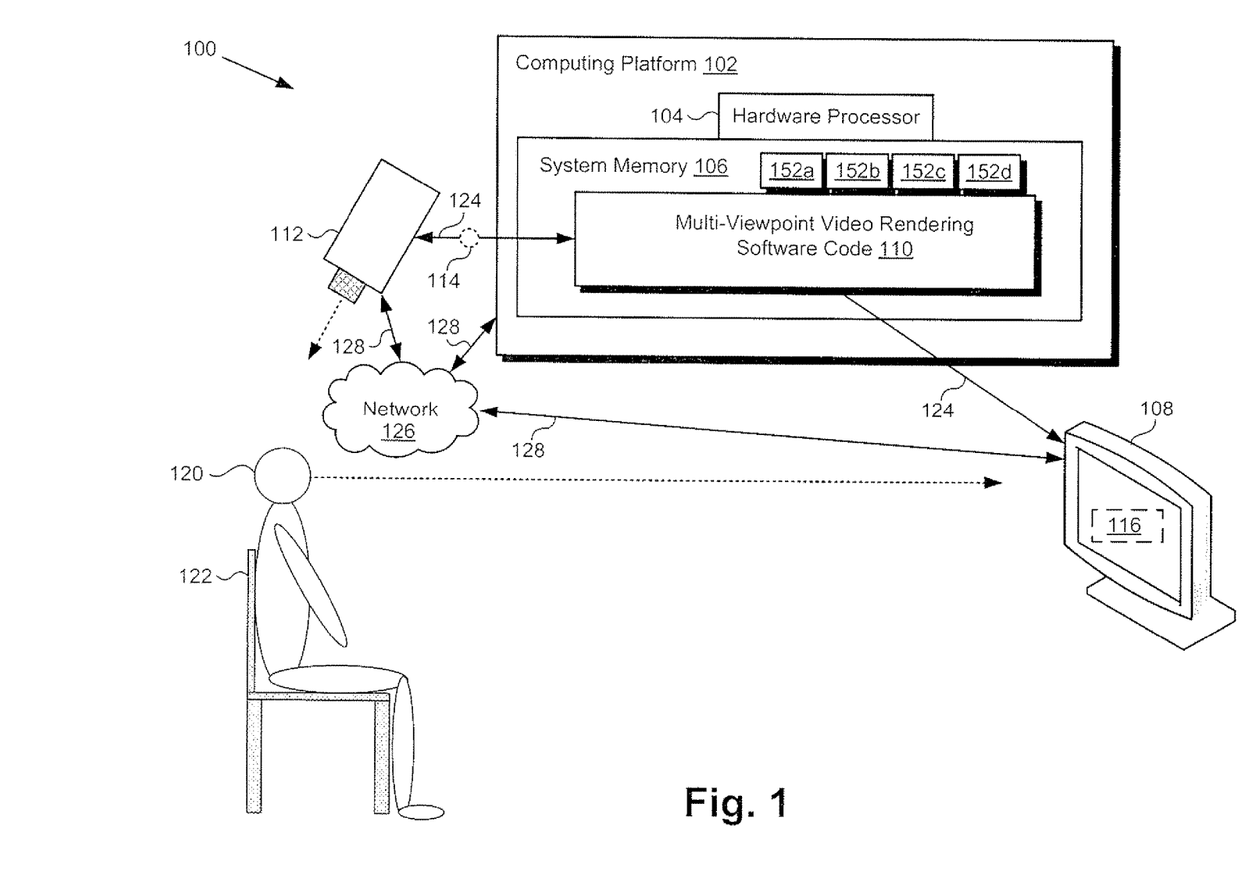
FIG. 1 shows a diagram of an exemplary augmented video rendering system, according to one implementation.

FIG. 1 shows a diagram of an exemplary augmented video rendering system, according to one implementation. As shown in FIG. 1, video rendering system 100 includes field-of-view detector 112, display 108, and computing platform 102 coupled to field-of-view detector 112 and display 108. As further shown in FIG. 1, computing platform 102 includes hardware processor 104, and system memory 106 implemented as a non-transitory storage device storing multi-viewpoint video rendering software code 110 and texel caches 152a, 152b, 152c, and 152d (hereinafter "texel caches 152a-152d").

According to the exemplary implementation shown in FIG. 1, video rendering system 100 is implemented as part of a use environment including user 120, who is shown to be seated on chair 122 for the purpose of viewing display 108, and may include communication network 126. Also shown in FIG. 1 are scene 116 rendered on display 108, perspective data 114 identifying a perspective adopted by user 120 while viewing scene 116, data links 124, and network communication links 128.

It is noted that, in various implementations, computing platform 102 of video rendering system 100 may be situated in the use environment including user 120, field-of-view detector 112, and display 108, or may be remote from user 120, field-of-view detector 112, and display 108. In implementations in which computing platform 102 is local to the use environment including user 120, field-of-view detector 112, and display 108, computing platform 102 may be directly coupled to field-of-view detector 112 and display 108 via data links 124, which may be wired or wireless data links. Alternatively, in implementations in which computing platform 102 is remote from field-of-view detector 112 and display 108, computing platform 102 may be coupled to field-of-view detector 112 and display 108 via communication network 126 and network communication links 128.

It is further noted that although FIG. 1 depicts multi-viewpoint video rendering software code 110 and texel caches 152a-152d as being co-located in system memory 106, that representation is merely provided as an aid to conceptual clarity. More generally, video rendering system 100 may include one or more computing platforms corresponding to computing platform 102, such as computer servers for example, which may be co-located, or may form an interactively linked but distributed system, such as a cloud based system, for instance.

As a result, hardware processor 104 and system memory 106 may correspond to distributed processor and memory resources within video rendering system 100. Thus, it is to be understood that one or more of multi-viewpoint video rendering software code 110 and texel caches 152a-152d may be stored and/or executed using the distributed memory and/or processor resources of video rendering system 100.

In some implementations, computing platform 102 of video rendering system 100 may correspond to one or more web servers, accessible over communication network 126 in the form of a packet-switched network such as the Internet, for example. Alternatively, computing platform 102 of video rendering system 100 may correspond to one or more computer servers supporting a local area network (LAN), or included in another type of limited distribution network.

Although field-of-view detector 112 is shown as a camera in FIG. 1, that representation is also provided merely as an example. More generally, field-of-view detector 112 may be any suitable sensor or sensor array for detecting the perspective or viewpoint adopted by user 120 while viewing scene 116. For example, in other implementations, field-of-view detector 112 may include a camera array, or one or more cameras in combination with one or more inertial sensors. Display 108 may take the form of a liquid crystal display (LCD), a light-emitting diode (LED) display, an organic light-emitting diode (OLED) display, or another suitable display screen that performs a physical transformation of signals to light.

As described in greater detail below in conjunction with the discussion directed to FIG. 4 of the present application, video rendering system 100 utilizes hardware processor 104 to execute multi-viewpoint video rendering software code 110 to render scene 116 on display 108. Multi-viewpoint video rendering software code 110, when executed by hardware processor 104, parameterizes visible surfaces in scene 116 to define multiple texels for each visible surface (visible surfaces and texels not shown in FIG. 1). For each texel of each visible surface, multi-viewpoint video rendering software code 110 precomputes one or more illumination value(s) and stores the illumination values in texel caches 152*a*-152*d* assigned respectively to each texel.

In addition, multi-viewpoint video rendering software code 110 receives perspective data 114 from field-of-view detector 112 identifying one of multiple permissible perspectives for viewing of scene 116 by user 120. For example, user 120 may remain seated in chair 122 while viewing scene 116, but may lean forward or to one side, or may move his/her head while viewing scene 116. Those movements by user 120 cause a shift in the perspective adopted by user 120. That shift in perspective, in turn, may alter the way scene 116 would appear to user 120 in a virtual reality experience, such as a virtual reality interactive television or cinematic experience, or a virtual reality based video game, for example.

Multi-viewpoint video rendering software code 110 further renders scene 116 on display 108 in real-time with respect to receiving perspective data 114, based on the perspective of user 120 and using at least one of the illumination values precomputed for each texel of each visible surface. It is noted that, as defined for the purposes of the present application, the expression "rendering scene 116 in real-time with respect to receiving perspective data 114" means that scene 116 is rendered seamlessly and without perceivable latency while incorporating the changes in perspective of user 120 during his/her viewing of scene 116. As a result, user 120 can enjoy augmented immersion in the experience of viewing scene 116, without disruption.

Figure 2:
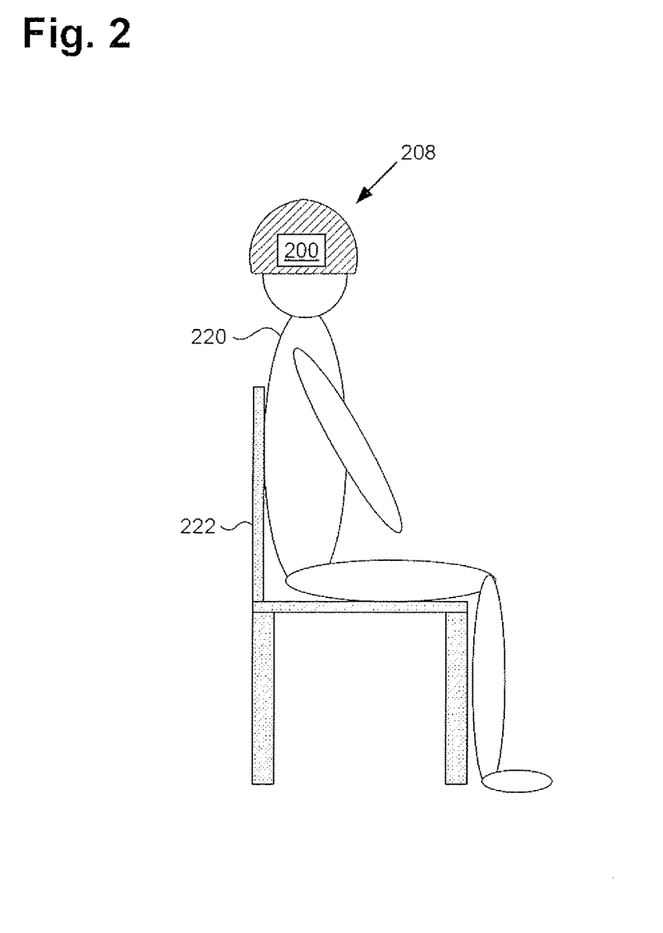
FIG. 2 shows a diagram of an exemplary augmented video rendering system, according to another implementation.

FIG. 2 shows another exemplary implementation of an augmented video rendering system. As shown in FIG. 2, video rendering system 200 is integrated with HMD 208. Also shown in FIG. 2 is user 220 seated in chair 222. User 220 and chair 222, in FIG. 2, correspond respectively to user 120 and chair 122, in FIG. 1. In addition, video rendering system 200 corresponds in general to video rendering system 100, in FIG. 1, and may share any of the characteristics attributed to that corresponding feature by the present disclosure.

Thus, although not shown in FIG. 2, video rendering system 200 includes a field-of-view detector and computing platform corresponding respectively in general to field-of-view detector 112 and computing platform 102, in FIG. 1. Moreover, the computing platform integrated with HMD 208 includes a hardware processor and a system memory corresponding respectively in general to hardware processor 104 and system memory 106 storing multi-viewpoint video rendering software code 110 and texel caches 152*a*-152*d*.

It is noted that although FIG. 2 depicts HMD 208 as a helmet, more generally, HMD 208 may assume a variety of wearable forms, including, for example, goggles or glasses. Moreover, in some implementations, HMD 208 may include a slot or port for receiving computing platform 102 in the form of a mobile computing device, such as a smartphone or tablet computer, for example. It is further noted that, when integrated with HMD 208, field-of-view detector 112 will typically include one or more inertial sensors, such as accelerometers and/or gyroscopes.

Figure 3:
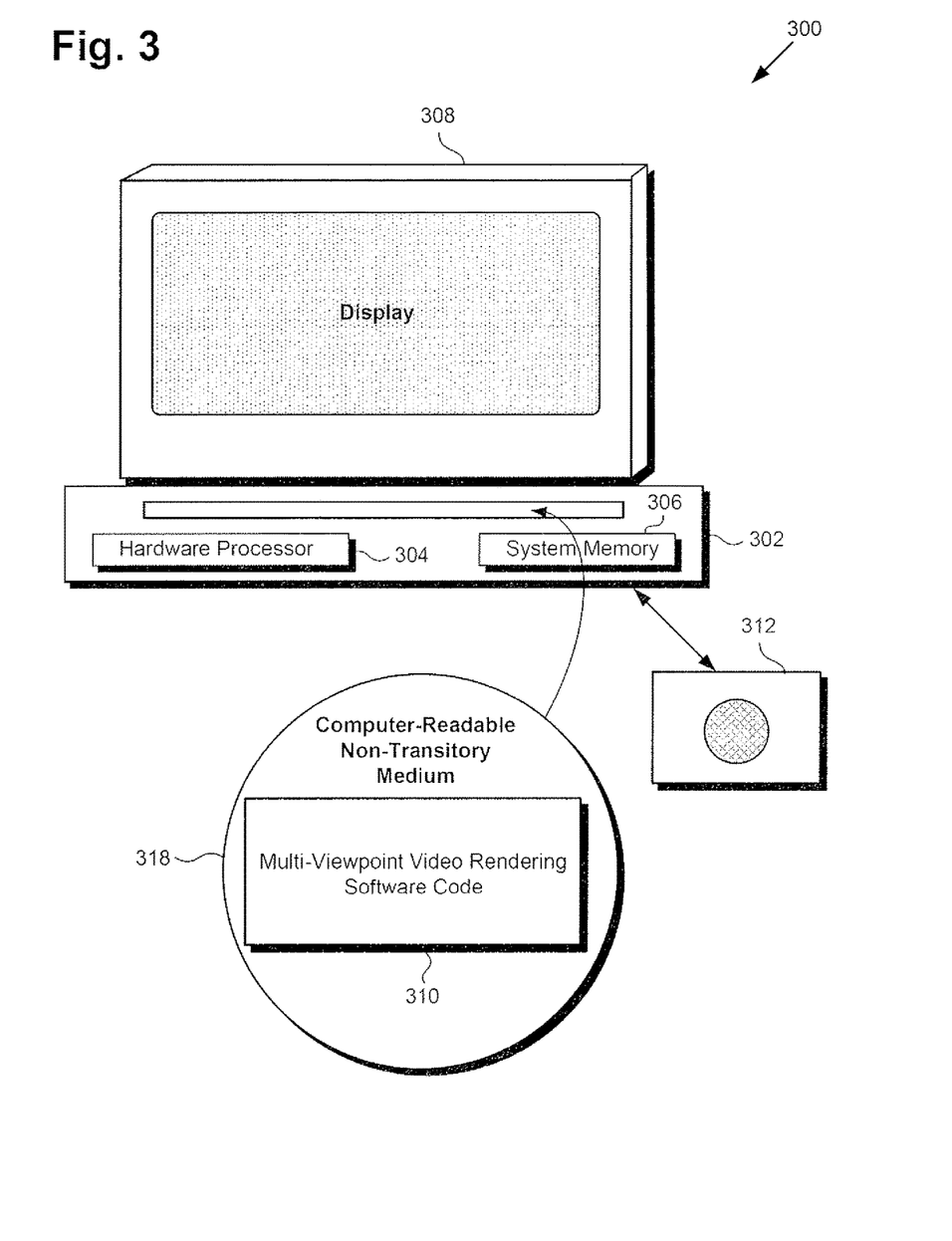
FIG. 3 shows an exemplary system and a computer-readable non-transitory medium including instructions for performing augmented video rendering, according to one implementation.

FIG. 3 shows exemplary video rendering system 300 and computer-readable non-transitory medium 318 including instructions for performing augmented video rendering, according to one implementation. Video rendering system 300 includes computing platform 302 coupled to field-of-view detector 312. Computing platform 302 includes hardware processor 304 and system memory 306, and is further coupled to display 308. Display 308 may take the form of an LCD, LED display, an OLED display, or another suitable display screen that performs a physical transformation of signals to light. Video rendering system 300 including field-of-view detector 312, display 308, and computing platform 302 having hardware processor 304 and system memory 306 corresponds in general to video rendering systems 100 and 200, in FIGS. 1 and 2. Consequently, video rendering system 300 may share any of the characteristics attributed to video rendering systems 100 and 200 and their corresponding features by the present disclosure.

Also shown in FIG. 3 is computer-readable non-transitory medium 318 having multi-viewpoint video rendering software code 310 stored thereon. The expression "computer-readable non-transitory medium," as used in the present application, refers to any medium, excluding a carrier wave or other transitory signal, that provides instructions to hardware processor 304 of computing platform 302. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 3, computer-readable non-transitory medium 318 provides multi-viewpoint video rendering software code 310 for execution by hardware processor 304 of computing platform 302. Multi-viewpoint video rendering software code 310 corresponds in general to multi-viewpoint video rendering software code 110, in FIG. 1, and is capable of performing all of the operations attributed to that corresponding feature by the present disclosure.

The functionality of multi-viewpoint video rendering software code 110/310 will be further described by reference to FIG. 4 in combination with FIGS. 1, 2, 3, and 5. FIG. 4 shows flowchart 430 presenting an exemplary method for use by a system, such as video rendering system 100/200/300 in FIG. 1/2/3, for performing augmented video rendering. With respect to the method outlined in FIG. 4, it is noted that certain details and features have been left out of flowchart 430 in order not to obscure the discussion of the inventive features in the present application.

Figure 5:
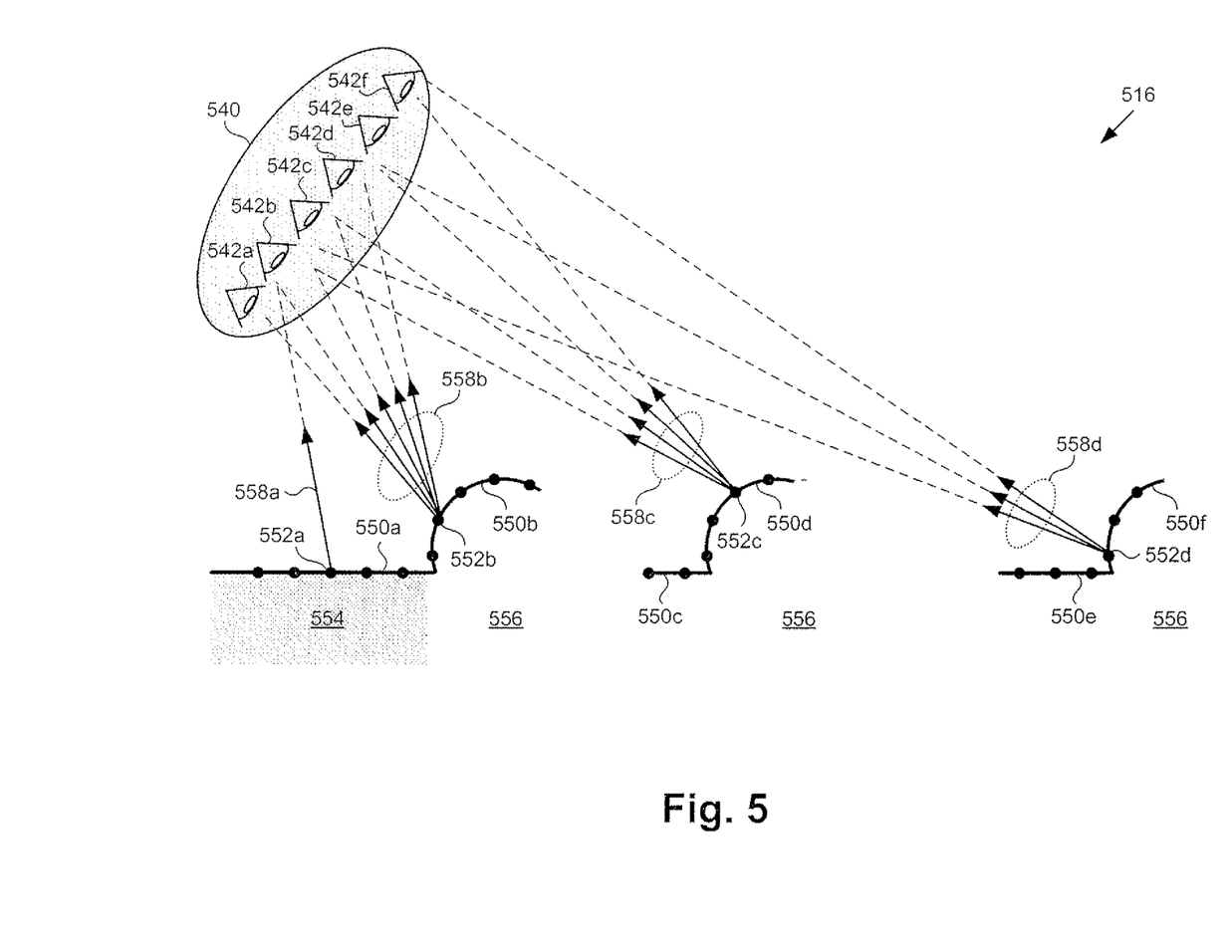
FIG. 5 shows an exemplary scene including multiple parameterized visible surfaces, in combination with permissible perspectives for viewing the scene, according to one implementation.

FIG. 5 shows exemplary scene 516 including multiple visible surfaces 550a, 550b, 550c, 550d, 550e, and 550f (hereinafter "visible surfaces 550a-550f") in combination with permissible perspectives 540 including viewing perspectives 542a, 542b, 542c, 542d, 542e, and 542f (hereinafter "viewing perspectives 542a-542f") for viewing scene 516, according to one implementation. As shown in FIG. 5, in addition to visible surfaces 550a-550f, scene 516 includes texels 552a, 552b, 552c, and 552d (hereinafter "texels 552a-552d"), and illumination values 558a, 558b, 558c, and 558d. Also shown in FIG. 5 are "diffuse" surface region 554 of scene 516 and "glossy" surface region 556 of scene 516.

With respect to "diffuse" and "glossy" surface regions 554 and 556, respectively, it is noted that surfaces that reflect light can be classified as either diffuse or glossy depending on whether the reflected light is distributed uniformly over the upper hemisphere of possible outgoing directions (diffuse surface), or if the distribution is non-uniform, e.g. most light is reflected in a finite cone around the direction given by the law of reflection (glossy surface). The appearance of glossy surfaces depends on the viewing direction (perspective), whereas diffuse surfaces appear substantially the same from any viewing direction.

Scene 516 corresponds in general to scene 116, in FIG. 1, and those corresponding features may share any of the characteristics attributed to either corresponding feature by the present disclosure. That is to say, like scene 516, scene 116 may include features corresponding respectively to visible surfaces 550a-550f, texels 552a-552d, illumination values 558a, 558b, 558c, and 558d, diffuse surface region 554 and glossy surface region 556. Moreover, like scene 116, scene 516 may be rendered on display 108/308 or HMD 208.

Figure 4:
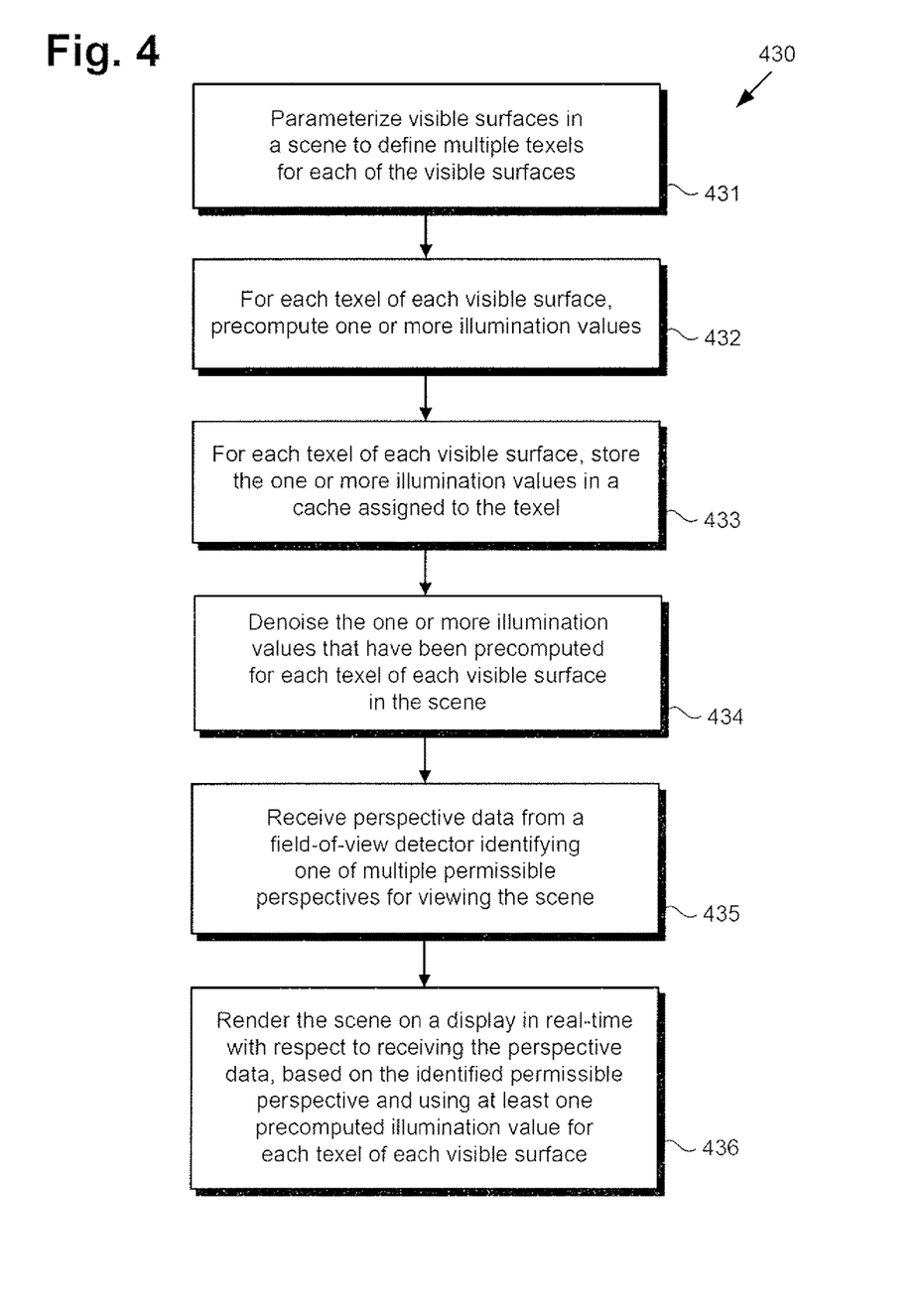
FIG. 4 shows a flowchart presenting an exemplary method for performing augmented video rendering, according to one implementation.

Referring now to FIG. 4 in combination with FIGS. 1, 2, 3, and 5, flowchart 430 begins with parameterizing visible surfaces 550a-550f in scene 116/516 to define texels such as texels 552a-552d for each of the visible surfaces (action 431). Parameterization of visible surfaces 550a-550f may be performed using any suitable texture mapping technology, such as Ptex™ for example. Visible surfaces 550a-550f of scene 116/516 may be parameterized using multi-viewpoint video rendering software code 110/310, executed by hardware processor 104/304.

Flowchart 430 continues with, for each texel of each of visible surfaces 550a-550f, precomputing one or more illumination value(s) such as illumination values 558a, 558b, 558c, and 558d (action 432). In one implementation, for example, illumination value(s) 558a, 558b, 558c, and 558d may take the form of precomputed shading for respective texels 552a-552d. Precomputation of the one or more illumination value(s) for each texel of each of visible surfaces 550a-550f may be performed by multi-viewpoint video rendering software code 110/310, executed by hardware processor 104/304.

In some use cases, visible surfaces 550a-550f may include some glossy surfaces, i.e., visible surfaces 550b, 550c, 550d, 550e, and 550f (hereinafter "glossy surfaces 550b-550f") in glossy surface region 556 of scene 116/516. In those use cases, the one or more illumination value(s) precomputed for each texel of each of glossy surfaces 550b-550f may include multiple illumination values corresponding to the reflectivity of each of glossy surfaces 550b-550f.

As shown in FIG. 5, for example, multiple illumination values 558b, such as shading values for instance, may be precomputed for texel 552b of glossy visible surface 550b. Analogously, multiple illumination values 558c and 558d may be precomputed for each of respective texels 552c and 552d of glossy visible surfaces 550d and 550f, respectively. By contrast, diffuse visible surface 550a in diffuse surface region 554 of scene 116/516 may have as few as one illumination value 558a, such as a single shading value for instance, precomputed for each texel. For example, and as further shown in FIG. 5, single illumination value 558a may be precomputed for texel 552a of diffuse visible surface 550a.

Alternatively, or in addition, in some use cases, visible surfaces 550a-550f may include some distant surfaces with respect to permissible perspectives 540 for viewing scene 116/516, i.e., visible surfaces 550d, 550e, and 550f (hereinafter "distant surfaces 550d-550f"). In those use cases, the one or more illumination value(s) precomputed for each texel of each of distant surfaces 550d-550f may include illumination values inversely proportional in number to the distance of each of distant surfaces 550d-550f from permissible perspectives 540. As shown in FIG. 5, for example, texel 552c of distant visible surface 550d has more precomputed illumination values 558c than has texel 552d of more distant glossy visible surface 550f.

It is noted that reflections from glossy surfaces 550b-550f may be perspective dependent due to their close proximity to permissible perspectives 540, as well as to their glossiness. In those use cases in which glossy surfaces 550b-550f are present, the one or more illumination value(s) precomputed for each texel of each of glossy surfaces 550b-550f may include multiple illumination values corresponding to the number of viewing perspectives 542a-542f included in permissible perspectives 540.

According to the exemplary implementation shown in FIG. 5, permissible perspectives 540 for viewing scene 116/516 include six viewing perspectives 542a-542f, while illumination values 558c of texel 552c of glossy surface 550d, for example, include four precomputed illumination values. However, in implementations in which permissible perspectives 540 include more than six viewing perspectives 542a-542f, illumination values 558c of texel 552c may include more than four precomputed illumination values. Conversely, in implementations in which permissible perspectives 540 include fewer than six viewing perspectives 542a-542f, illumination values 558c of texel 552c may include correspondingly fewer than four precomputed illumination values. Moreover, the number of illumination values 558b and 558d precomputed for respective texels 552b and 552d may vary in analogous fashion based on the number of viewing perspectives included in permissible perspectives 540.

By contrast, visible surface 550a is perspective independent due to its being a diffuse surface and/or due to its distance away from permissible perspectives 540. Consequently, texel 552a of visible surface 550a may have single precomputed illumination value 558a when permissible perspectives 540 number more than six viewing perspectives 542a-542f as well as when permissible perspectives 540 number less than six viewing perspectives 542a-542f.

Flowchart 430 continues with, for each texel of each of visible surfaces 550a-550f, store its one or more illumination value(s) in a cache assigned to that texel (action 433). For example, illumination value 558a precomputed for texel 552a may be stored in texel cache 152a, while illumination values 558b precomputed for texel 552b by may be stored in texel cache 152b. Similarly, illumination values 558c and 558d precomputed for respective texels 552c and 552d by may be stored in respective texel caches 152c and 152d.

Illumination value(s) 558a, 558b, 558c, and 558d may be precomputed shading value(s) for respective texels 552a-552d, and may be stored in respective texel caches 152a-152d as outgoing radiance value(s) directed toward one or more of viewing perspectives 542a-542f. Storing the one or more illumination value(s) for each texel of each of visible surfaces 550a-550f in a cache assigned to that texel may be performed by multi-viewpoint video rendering software code 110/310, executed by hardware processor 104/304.

In some implementations, the method outlined by flowchart 430 may continue with denoising the one or more illumination value(s) precomputed for each texel of each of visible surfaces 550a-550f (action 434). According to some implementations, illumination value(s) 558a, 558b, 558c, and 558d of glossy surfaces 550b-550f may be expressed as respective four-dimensional functions of surface location and angle. In those implementations, denoising of each 4D function corresponding respectively to an illumination value of glossy surfaces 550b-550f may include projecting the 4D function onto a two-dimensional image, denoising the 2D image, and mapping the denoised 2D image into the 4D function space of the 4D function. Denoising of the one or more illumination value(s) precomputed for each texel of each of visible surfaces 550a-550f may be performed by multi-viewpoint video rendering software code 110/310, executed by hardware processor 104/304.

Flowchart 430 continues with receiving perspective data 114 from field-of-view detector 112/312 identifying one of permissible perspectives 540, i.e., one of viewing perspectives 542a-542b for viewing scene 116/516 (action 435). As noted above, user 120/220 may remain seated in chair 122/222 while viewing scene 116/516, but may lean forward or to one side, or may move his/her head while viewing scene 116/516. Those movements by user 120/220 cause a shift in the perspective adopted by user 120/220 while viewing scene 116/516, and may result in transition from one of viewing perspectives 542a-542f to another of viewing perspectives 542a-542f.

As further noted above, field-of-view detector 112/312 may include one or more cameras, and/or one or more inertial sensors for detecting changes in the viewing perspective adopted by user 120/220. Field-of-view detector 112/312 generates perspective data 114 identifying one of permissible perspectives 540 as the present viewing perspective adopted by user 120/220 for viewing scene 116/516. As shown in FIG. 1, perspective data 114 may be received by multi-viewpoint video rendering software code 110/310 of video rendering system 100/200/300, executed by hardware processor 104/304.

Flowchart 430 can conclude with rendering scene 116/516 on display 108/308 or HMD 208 in real-time with respect to receiving perspective data 114, based on the identified one of permissible perspectives 540 and using at least one of the illumination value(s) precomputed for each texel of each of visible surfaces 550a-550f (action 436). Rendering of scene 116/516 may include, for each of visible surfaces 550a-550f, interpolating over all four surface and angular dimensions to approximate the radiance coming from each texel toward the one viewing perspective of permissible perspectives 540 adopted by user 120/220 and identified in action 435. The rendering of scene 116/516 on display 108/308 or HMD 208 may be performed by multi-viewpoint video rendering software code 110/310, executed by hardware processor 104/304.

As noted above, movement by user 120/220 during viewing of scene 116/516 may correspond to a transition from one of viewing perspectives 542a-542f to another of viewing perspectives 542a-542f. That shift of viewing perspectives may alter the way scene 116/516 would appear of user 120/220 in a virtual reality experience, such as a virtual reality interactive television or cinematic experience, or a virtual reality based video game. Nevertheless, multi-viewpoint video rendering software code 110/310 renders scene 116/516 on display 108/308 or HMD 208 in real-time with respect to receiving perspective data 114, i.e., seamlessly and without perceivable latency while incorporating the change in viewing perspective by user 120/220. As a result, user 120/220 can enjoy augmented immersion in the experience of viewing scene 116/516 at cinematic frame rates, such as twenty-four frames per second (24 fps) or higher, without interruption or delay.

Thus, the present application discloses an augmented video rendering solution. As described above, the present solution includes parameterizing visible surfaces in a scene, and precomputing one or more illumination values for each texel of each visible surface to provision the scene with rendering data prior to rendering the scene. In addition, the present solution includes identifying one of multiple permissible perspectives for viewing the scene adopted by a user, and rendering the scene based on the identified permissible perspective and one or more of the precomputed illumination values. As a result, the present augmented video rendering solution advantageously enables a user to adopt multiple viewing perspectives for viewing the scene, while concurrently rendering cinematic quality video.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A video rendering system comprising:
   a field-of-view detector;
   a display; and
   a computing platform coupled to the field-of-view detector and the display, the computing platform including a hardware processor and a system memory having a multi-viewpoint video rendering software code stored therein;
   the hardware processor configured to execute the multi-viewpoint video rendering software code to:
   parameterize a plurality of visible surfaces in a scene to define a plurality of texels for each of the plurality of visible surfaces;
   for each texel of each of the plurality of visible surfaces, precompute at least one illumination value;
   for each texel of each of the plurality of visible surfaces, store the at least one illumination value in a cache assigned to the texel;
   receive a perspective data from the field-of-view detector identifying one of a plurality of permissible perspectives for viewing the scene; and render the scene on the display in real-time with respect to receiving the perspective data, based on the one of the plurality of permissible perspectives and using at least one of the at least one illumination value precomputed for each texel of each of the plurality of visible surfaces;

wherein the plurality of visible surfaces include one or more of (a)-(c):

(a) at least some diffuse surfaces, wherein the at least one illumination value precomputed for each texel of each of the at least some of the diffuse surfaces comprises a single illumination value;

(b) at least some distant surfaces with respect to the plurality of permissible perspectives for viewing the scene, wherein the at least one illumination value precomputed for each texel of each of the at least some of the distant surfaces comprises a plurality of illumination values inversely proportional in number to a distance of each of the at least some distant surfaces; and (c) at least some glossy surfaces, wherein the at least one illumination value precomputed for each texel of each of the at least some glossy surfaces comprises a plurality of illumination values corresponding to a reflectivity of each of the at least some of the glossy surfaces.

2. The video rendering system of claim 1, wherein the hardware processor is further configured to execute the multi-viewpoint video rendering software code to, prior to receiving the perspective data from the field-of-view detector, denoise the at least one illumination value precomputed for each texel of each of the plurality of visible surfaces.

3. The video rendering system of claim 2, wherein the plurality of illumination values precomputed for each texel of each of the at least some glossy surfaces comprise four-dimensional (4D) functions.

4. The video rendering system of claim 3, wherein denoising the at least one illumination value precomputed for each texel of each of the plurality of visible surfaces comprises, for each 4D function:
projecting the 4D function onto a two-dimensional (2D) image;
denoising the 2D image; and
mapping the denoised 2D image into a 4D function space of the 4D function.

5. A method for use by a video rendering system including a field-of-view detector, a display, and a computing platform coupled to the field-of-view detector and the display, the computing platform including a hardware processor and a system memory having a multi-viewpoint video rendering software code stored therein, the method comprising:
parameterizing, using the hardware processor, a plurality of visible surfaces in a scene to define a plurality of texels for each of the plurality of visible surfaces;
for each texel of each of the plurality of visible surfaces, precomputing, using the hardware processor, at least one illumination value;
for each texel of each of the plurality of visible surfaces, storing, using the hardware processor, the at least one illumination value in a cache assigned to the texel;
receiving, using the hardware processor, a perspective data from the field-of-view detector identifying one of a plurality of permissible perspectives for viewing the scene; and
rendering the scene on the display in real-time with respect to receiving the perspective data, using the hardware processor, based on the one of the plurality of permissible perspectives and using at least one of the at least one illumination value precomputed for each texel of each of the plurality of visible surfaces;

wherein the plurality of visible surfaces include one or more of (a)-(c):

(a) at least some diffuse surfaces, wherein the at least one illumination value precomputed for each texel of each of the at least some of the diffuse surfaces comprises a single illumination value;

(b) at least some distant surfaces with respect to the plurality of permissible perspectives for viewing the scene, wherein the at least one illumination value precomputed for each texel of each of the at least some of the distant surfaces comprises a plurality of illumination values inversely proportional in number to a distance of each of the at least some distant surfaces; and (c) at least some glossy surfaces, wherein the at least one illumination value precomputed for each texel of each of the at least some glossy surfaces comprises a plurality of illumination values corresponding to a reflectivity of each of the at least some of the glossy surfaces.

6. The method of claim 5, wherein the method further comprises, prior to receiving the perspective data from the field-of-view detector, denoising, using the hardware processor, the at least one illumination value precomputed for each texel of each of the plurality of visible surfaces.

7. The method of claim 6, wherein the plurality of illumination values precomputed for each texel of each of the at least some glossy surfaces comprise four-dimensional (4D) functions.

8. The method of claim 7, wherein denoising the at least one illumination value precomputed for each texel of each of the plurality of visible surfaces comprises, for each 4D function:
projecting, using the hardware processor, the 4D function onto a two-dimensional (2D) image;
denoising, using the hardware processor, the 2D image; and
mapping, using the hardware processor, the denoised 2D image into a 4D function space of the 4D function.

9. A computer-readable non-transitory medium having stored thereon instructions, which when executed by a hardware processor, instantiate a method comprising:
parameterizing a plurality of visible surfaces in a scene to define a plurality of texels for each of the plurality of visible surfaces;
for each texel of each of the plurality of visible surfaces, precomputing at least one illumination value;
for each texel of each of the plurality of visible surfaces, storing the at least one illumination value in a cache assigned to the texel;
receiving a perspective data identifying one of a plurality of permissible perspectives for viewing the scene; and
rendering the scene in real-time with respect to receiving the perspective data, based on the one of the plurality of permissible perspectives and using at least one of the at least one illumination value precomputed for each texel of each of the plurality of visible surfaces;

wherein the plurality of visible surfaces include one or more of (a)-(c):

(a) at least some diffuse surfaces, wherein the at least one illumination value precomputed for each texel of each of the at least some of the diffuse surfaces comprises a single illumination value;

(b) at least some distant surfaces with respect to the plurality of permissible perspectives for viewing the scene, wherein the at least one illumination value precomputed for each texel of each of the at least some of the distant surfaces comprises a plurality of illumination values inversely proportional in number to a distance of each of the at least some distant surfaces; and (c) at least some glossy surfaces, wherein the at least one illumination value precomputed for each texel of each of the at least some glossy surfaces comprises a plurality of illumination values corresponding to a reflectivity of each of the at least some of the glossy surfaces.

10. The computer-readable non-transitory medium of claim 9, wherein the plurality of illuminations value precomputed for each texel of each of the at least some glossy surfaces comprise four-dimensional (4D) functions.

11. The computer-readable non-transitory medium of claim 10, wherein denoising the at least one illumination value precomputed for each texel of each of the plurality of visible surfaces comprises, for each 4D function:

projecting the 4D function onto a two-dimensional (2D) image;

denoising the 2D image; and mapping the denoised 2D image into a 4D function space of the 4D function.

12. The computer-readable non-transitory medium of claim 9, wherein the method further comprises, prior to receiving the perspective data from the field-of-view detector, denoising the at least one illumination value precomputed for each texel of each of the plurality of visible surfaces.

* * * * *